(12) United States Patent
Rabenoro et al.

(10) Patent No.: US 9,792,741 B2
(45) Date of Patent: Oct. 17, 2017

(54) METHOD OF ESTIMATION ON A CURVE OF A RELEVANT POINT FOR THE DETECTION OF AN ANOMALY OF A MOTOR AND DATA PROCESSING SYSTEM FOR THE IMPLEMENTATION THEREOF

(71) Applicant: SNECMA, Paris (FR)

(72) Inventors: Tsirizo Rabenoro, Melun (FR); Jerome Henri Noel Lacaille, Rosny sous Bois (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/906,470

(22) PCT Filed: Jul. 21, 2014

(86) PCT No.: PCT/FR2014/051882
§ 371 (c)(1),
(2) Date: Jan. 20, 2016

(87) PCT Pub. No.: WO2015/011395
PCT Pub. Date: Jan. 29, 2015

(65) Prior Publication Data
US 2016/0163132 A1    Jun. 9, 2016

(30) Foreign Application Priority Data
Jul. 23, 2013    (FR) ...................................... 13 57252

(51) Int. Cl.
*G07C 5/08*    (2006.01)
*G07C 5/12*    (2006.01)
(Continued)

(52) U.S. Cl.
CPC ......... *G07C 5/0808* (2013.01); *F01D 21/003* (2013.01); *F02C 7/00* (2013.01);
(Continued)

(58) Field of Classification Search
CPC ........... F05D 2260/80; F05D 2260/821; F01D 21/003; F02C 7/00; G05B 23/0243;
(Continued)

(56) References Cited

U.S. PATENT DOCUMENTS 9,317,983 B2 *   4/2016   Ricci ..................... H04W 4/046
9,418,493 B1 *   8/2016   Dong ................. G05B 23/0221
(Continued)

FOREIGN PATENT DOCUMENTS

EP   2 570 880 A2   3/2013
FR   2 939 170 A1   6/2010

OTHER PUBLICATIONS

International Search Report dated Nov. 19, 2014 for PCT/FR2014/051882 filed on Jul. 21, 2014.
(Continued)

*Primary Examiner* — Atul Trivedi
(74) *Attorney, Agent, or Firm* — Oblon, McClelland, Maier & Neustadt, L.L.P.

(57) ABSTRACT

A method of estimation on a curve of a relevant point for detecting an anomaly of a motor. The method includes selecting a profile including a binary code, each component of which codes a direction of variation between two consecutive characteristic points of at least one learning curve, a model making it possible to estimate a relevant point based on a set of characteristic points of a curve and a filter. The method also includes applying the filter of the profile selected to the curve, determining a set of characteristic points of the filtered curve and of a binary code, comparing the determined code and the code of the profile selected, and estimating, as a function of the comparison, the relevant point on the curve based on the characteristic points of the filtered curve and the model of the profile selected.

14 Claims, 8 Drawing Sheets

(51) Int. Cl.
  *F01D 21/00* (2006.01)
  *F02C 7/00* (2006.01)
  *G05B 23/02* (2006.01)
(52) U.S. Cl.
  CPC ..... *G05B 23/0243* (2013.01); *G05B 23/0254* (2013.01); *G07C 5/0825* (2013.01); *G07C 5/12* (2013.01); *F05D 2260/80* (2013.01); *F05D 2260/821* (2013.01)
(58) Field of Classification Search
  CPC .... G05B 23/0254; G07C 5/12; G07C 5/0808; G07C 5/0825
  USPC .......................................................... 701/99
  See application file for complete search history.

(56) References Cited

U.S. PATENT DOCUMENTS

| | | | | |
|---|---|---|---|---|
| 2003/0065409 | A1* | 4/2003 | Raeth | G05B 9/02 700/31 |
| 2005/0267702 | A1* | 12/2005 | Shah | G05B 23/0229 702/81 |
| 2010/0161196 | A1* | 6/2010 | Goericke | G05B 23/0283 701/99 |
| 2010/0281843 | A1* | 11/2010 | Smith | F01D 17/08 60/39.091 |
| 2011/0288836 | A1 | 11/2011 | Lacaille et al. | |
| 2013/0006541 | A1* | 1/2013 | Kominsky | G05B 23/024 702/34 |
| 2013/0068003 | A1* | 3/2013 | Kumar | F02D 41/0097 73/114.25 |
| 2013/0073141 | A1 | 3/2013 | Smith et al. | |
| 2014/0201126 | A1* | 7/2014 | Zadeh | G06K 9/627 706/52 |
| 2015/0051847 | A1* | 2/2015 | Angello | F01D 21/003 702/35 |

OTHER PUBLICATIONS

International Search Report and Written Opinion dated Nov. 19, 2014 in PCT/FR2014/051882 filed Jul. 21, 2014 (with English translation of Category of Cited Documents).

Preliminary Search Report dated May 7, 2014 in French Patent Application No. FR1357252 (with English translation of Category of Cited Documents).

* cited by examiner

METHOD OF ESTIMATION ON A CURVE OF A RELEVANT POINT FOR THE DETECTION OF AN ANOMALY OF A MOTOR AND DATA PROCESSING SYSTEM FOR THE IMPLEMENTATION THEREOF

FIELD OF THE INVENTION

The invention generally relates to the field for monitoring the operation condition of an engine.

The invention more specifically relates to a method for estimating on a curve a relevant point for detection of an anomaly of an engine as well as to the data processing system for its implementation.

STATE OF THE ART

In the field of aeronautics, it is important to be able to monitor the operating condition of an aircraft engine in order to predict and plan maintenance operations on this engine. The operating condition of the engine may actually change over time and suitable monitoring may give the possibility of detecting operation anomalies, monitoring a degradation of the engine and plan in advance possible maintenance operations. This notably gives the possibility of avoiding delays on flights, of carrying out repairs before the degradation is too significant, grouping repair operations with each other, etc.

Monitoring tools have been developed in order to identify anomalies altering the operation of the engine from measurements of physical parameters describing the condition of the engine.

Figure 1:
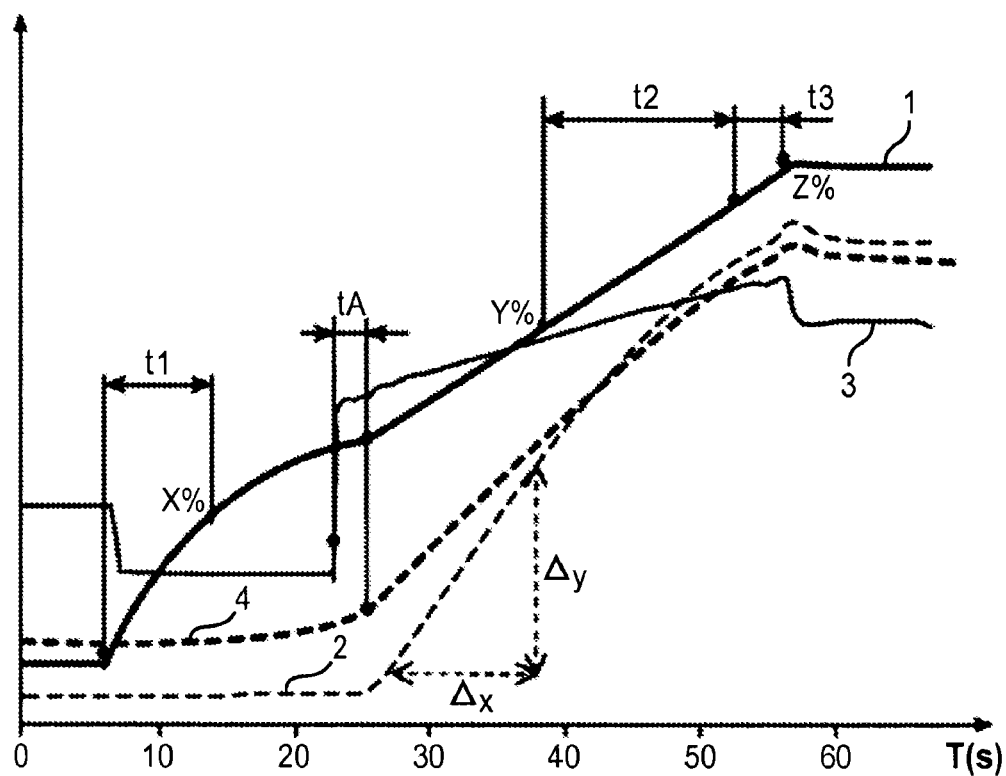

Methods have also been described allowing measurement of the operating parameters of the engine to be monitored, calculating indicators representative of the operating condition of the engine, and identifying operation anomalies of the engine from said indicators. An example of such methods is described in the patents of the applicant FR2939924 and FR2942001. These indicators are defined by experts in the behavior of engines. Thus, as regards the detection of anomalies preventing the starting of the engine, indicators such as an opening time of the starting valve, a time for attaining maximum acceleration of the high pressure compressor, instants t1, t2 and t3 of the first, second and third starting phases, an ignition time of the engine, a closing time of the starting valve, a gradient of the temperature of the exhaust gases or a stopping time of the engine may be defined. FIG. 1 shows the time-dependent change of the speed 1 of the high pressure compressor, of the temperature 2 of the exhaust gases EGT (Exhaust Gas Temperature), of the fuel flow rate 3 sent to the injectors and of the pressure 4, as well as the durations t1, t2 and t3.

Such indicators may be calculated depending on relevant instants on the curves of the measurements of the operating parameters of the engine. Such relevant instants are marked on these curves by the experts.

These methods have the drawback of systematic involvement of experts for marking such instants and consequently make it necessary to store the whole of these measurement curves as long as such marking has not been carried out by an expert.

In order to overcome these drawbacks, tools giving the possibility of achieving automatic detection of such relevant instants, without resorting to an expert, have been developed. The use of such tools notably gives the possibility of not having to store any longer a substantial amount of data over long durations, only the indicators calculated from relevant instants automatically determined, being stored in fine.

Some of these tools may notably extract a particular relevant instant from descriptions of this instant provided by experts during the development of the tool. Nevertheless, such solutions require the development of a different tool for each type of relevant instant to be detected. They also have the drawback of imposing to the expert a fine description of the characteristics of the relevant instant, in a comprehensive way for the designer of the tool, so that the latter retranscribes these characteristics in an algorithmic form.

Figure 2:
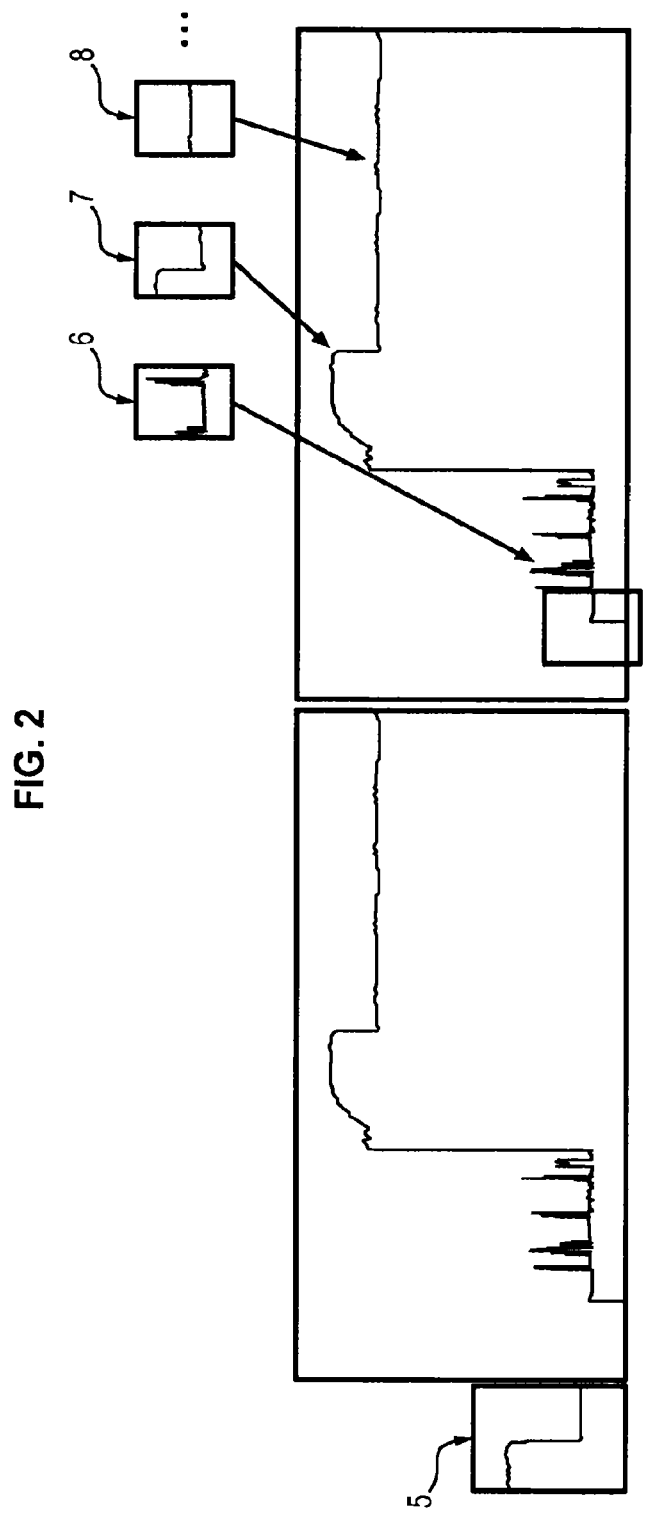

In order to get rid of these constraints, generic tools have been developed, giving the possibility of detecting a relevant instant on any type of curve without having to adapt the tool and not requiring any detailed description of the characteristics of such instant by an expert. The existing tools of this type may for example be based on pattern recognition. Their principle is to recognize on a curve a known characteristic shape which is assumed by the curve in the vicinity of a relevant instant to be detected, as illustrated in FIG. 2 illustrating the case when it is sought to determine the location on a curve of a characteristic shape such as the shape 5.

The time for detecting with such tools a relevant point on a curve is nevertheless particularly lengthy. Indeed, the whole of the curve is covered in order to extract shapes 6, 7 and 8 locally assumed by the curve, and these shapes are then compared with the sought shape. Further, such an analysis has to be conducted at different scales in order to detect the sought shape in the curve regardless of the scale at which this shape appears in the curve. Such processing operations impose a significant amount of calculations which slow down the detection of a relevant point on the curve.

Further such tools are focused on the detection of a particular shape in the vicinity of the point of interest and neglect the information borne by the global shape of the curve.

Therefore there exists a need for a generic tool giving the possibility of detecting rapidly a relevant point on a curve without carrying out a costly multi-scale analysis, while taking into account the whole of said curve and limiting the amount of data to be stored.

SUMMARY OF THE INVENTION

The present invention thus according to a first aspect relates to a method for estimating on a curve a relevant point for detecting an anomaly of an engine, said curve representing a time-dependent change of physical parameters of the operation of the engine measured by at least one sensor on said engine, applied by a computer connected to first storage means, said first storage means storing in memory at least one profile comprising a binary code, each component of which codes a direction of variation between two consecutive characteristic points of at least one learning curve, a model giving the possibility of estimating a relevant point from a set of characteristic points of a curve and a filter, said method comprising:

a/ selecting a profile stored in memory in the first storage means;

b/ applying the filter of the selected profile to said curve;

c/ determining a set of characteristic points of said filtered curve and of a binary code, each component of which codes the direction of variation of two consecutive characteristic points belonging to said set of characteristic points;

d/ comparing the determined code and the code from the selected profile;

e/ depending on said comparison, estimating the relevant point on said curve from characteristic points of said filtered curve and from the model of the selected profile.

Such a method gives the possibility of achieving rapid determination of a relevant point on a curve, regardless of the relevant point type, without resorting to an expert. Such a method also gives the possibility of taking into account the whole shape of the curve, while reducing to a minimum the amount of information to be stored by only storing in memory the characteristic points of this curve.

According to other advantageous and non-limiting characteristics:

if the determined code is different from the code of the selected profile, a new profile stored in memory in the first storage means may be selected and the computer may again execute steps b/ to e/ of the method according to the first aspect;

the relevant point may be selected from an instant for opening a valve, a clear variation instant of a temperature or of a pressure, an instant when certain conditions are attained by a high pressure compressor or a law pressure compressor, a disengagement instant of a starter;

the characteristic points of curves may be selected from: inflection points, local extrema, sudden changes of slopes.

These points are particular points of a curve which allow characterization of the global shape of the curve since all the curves of a same parameter measured during the same operating phase on various engines have the same global shape and show the same characteristic points.

a profile may further comprise a threshold and the characteristic points may be consecutive local extrema, for which the difference in ordinates is greater than said threshold;

This gives the possibility of minimizing the number of characteristic points to be stored in memory by only retaining the points actually distinct from their neighbors.

the models may be generalized linear models with selection of variables;

the models may verify the equation: $t=AX$ wherein t is the abscissa of the relevant point to be estimated, A is a line vector containing regression coefficients, X is a column vector whose components are abscissas of the characteristic points and their transforms.

Such a model allows determination of the abscissa of a relevant point only from the abscissas of the characteristic points, without requiring a significant amount of calculation.

in an embodiment of the method according to the first aspect, the computer may execute:

an estimation step from estimated relevant points of specific indicators selected for their representativity of the operating condition of the engine;

a step for diagnosing the engine from estimated specific indicators;

a step for storing in memory in the storage means, flight after flight, estimated specific indicators and a step for predicting a degradation of the operation state of the engine from the time-dependent change of the specific indicators stored in memory.

This gives the possibility of diagnosing and predicting automatically a possible failure of the engine or a degradation of its operation condition.

each profile stored in memory in the first storage means may be determined by a learning process;

this learning process for a profile may comprise:

a/ the display by a display device of several learning curves;

b/ the determination by said computer of a relevant point for detecting an anomaly on each of the learning curves, said relevant point of each of the learning curves being selected by an expert by means of input means;

c/ the storage in second storage means of each of said learning curves, associated with said determined relevant point;

d/ the selection with said computer of a filter and a model;

e/ the application by said computer of the selected filter to each of the learning curves;

f/ the determination by said computer of the characteristic points of each of the filtered learning curves;

g/ the determination by said computer from among the determined characteristic points of recurrent characteristic points appearing on each filtered learning curve and of a binary code, each component of which codes the direction of variation between two consecutive recurrent characteristic points;

h/ from the determined recurrent characteristic points and from the selected model, the estimation by said computer of the relevant point;

i/ the estimation by said computer of the error associated with the selected filter and model in step d/ by comparing the relevant point estimated with the relevant point selected by the expert in step b/;

j/ storing in memory, in said first storage means, a profile comprising said determined binary code, said filter and said model allowing minimization of the estimated error or obtaining an estimated error to be less than a determined threshold;

Such a process allows characterization of a relevant point automatically, without requiring from an expert that the latter has to accurately describe the characteristics of such a point and without requiring that a particular algorithm be defined for each type of relevant point.

According to a second aspect, the invention relates to a computer program product comprising program code instructions for executing steps of the method according to the first aspect when said program is executed on a computer.

According to a third aspect, the invention relates to a data processing system comprising a computer, input means, at least one display device characterized in that it is configured for applying the steps of the method according to the first aspect.

Such computer program system and product have the same advantages as those mentioned for the method according to the first aspect.

PRESENTATION OF THE DRAWINGS

Figure 3:
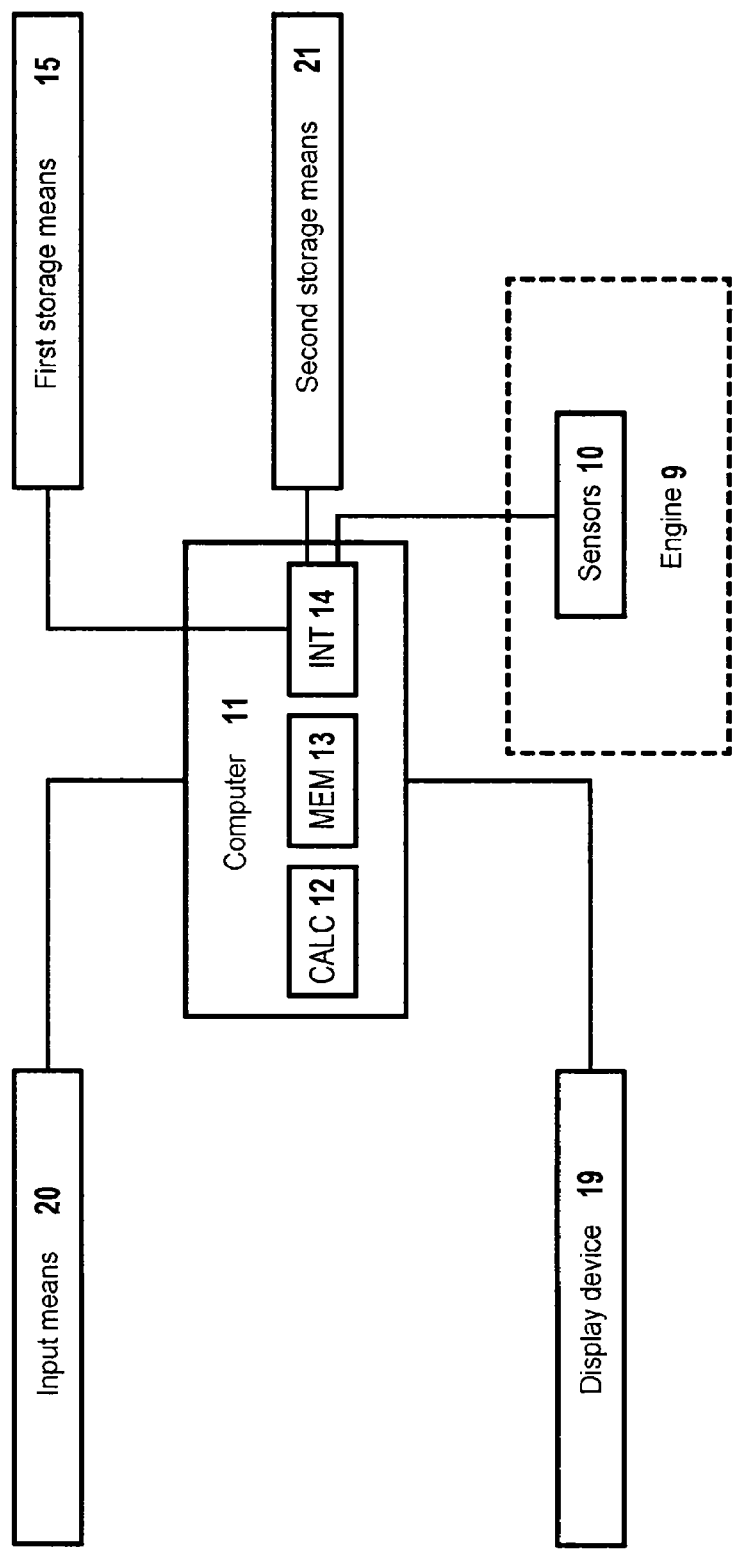
Figure 4:
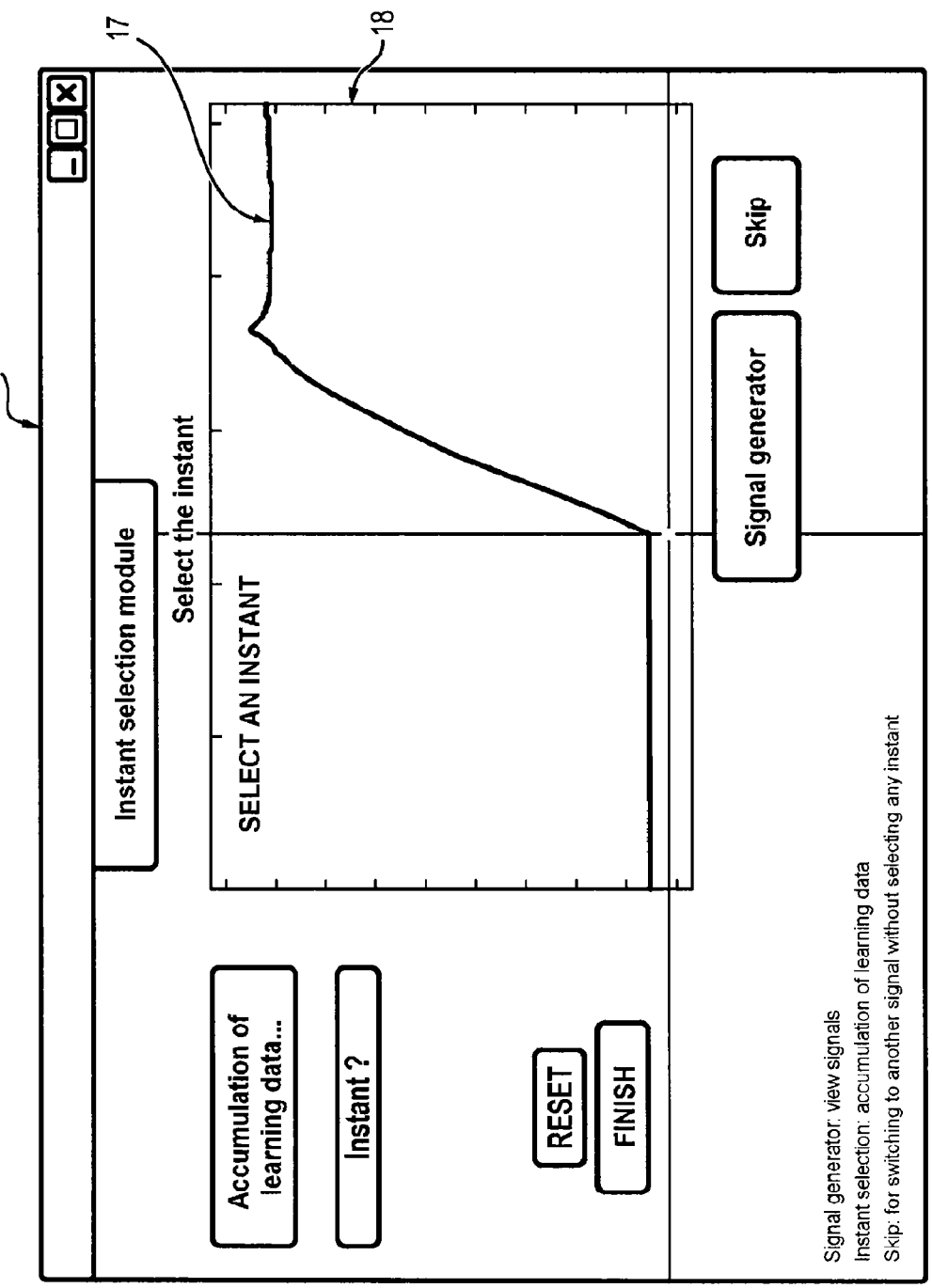
Figure 5:
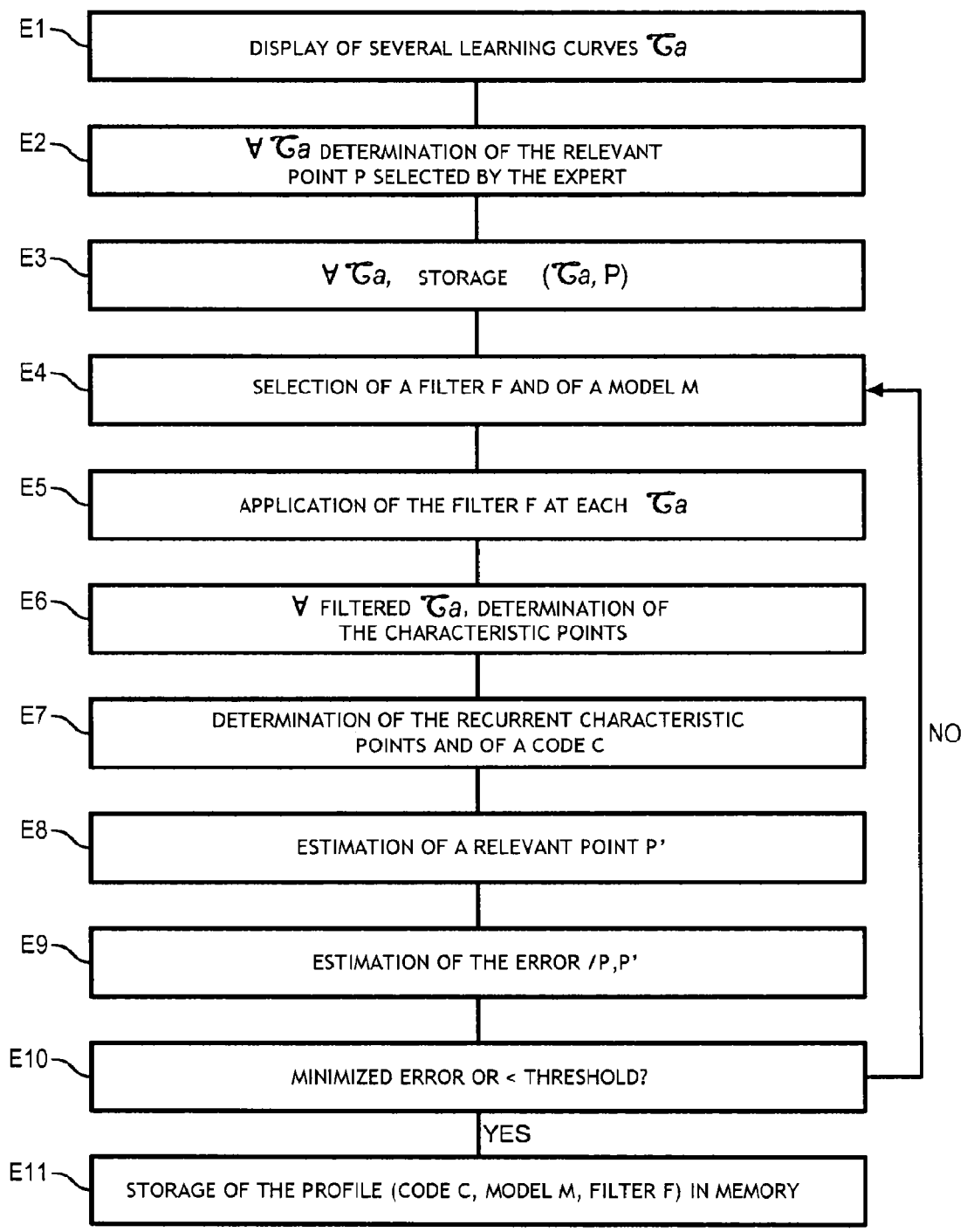
Figure 6:
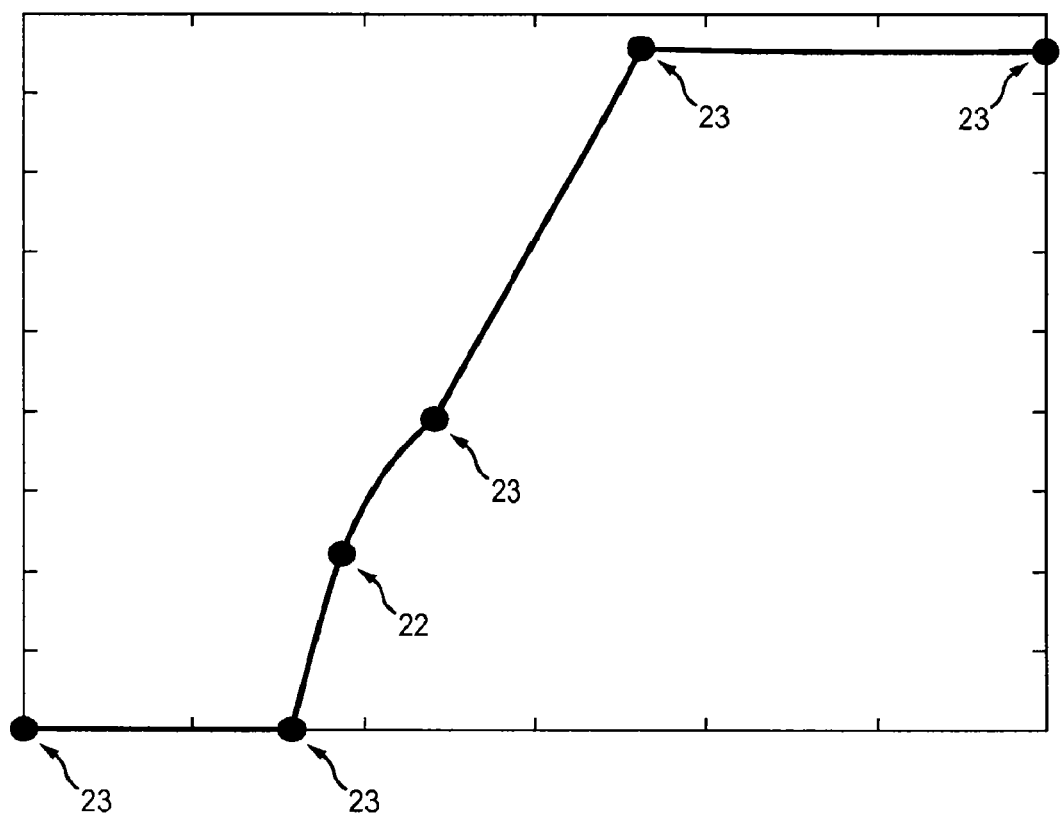
Figure 7:
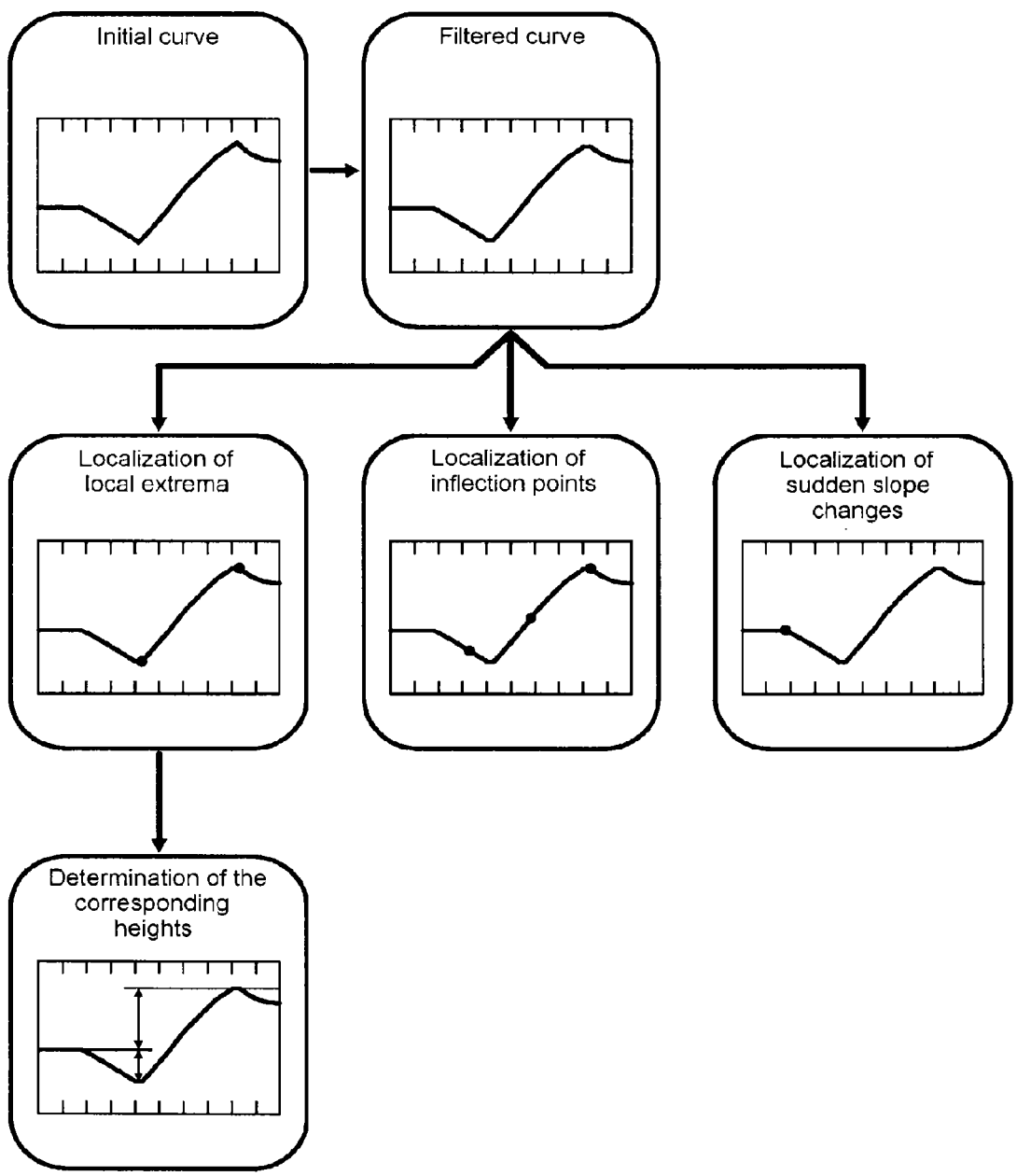
Figure 8:
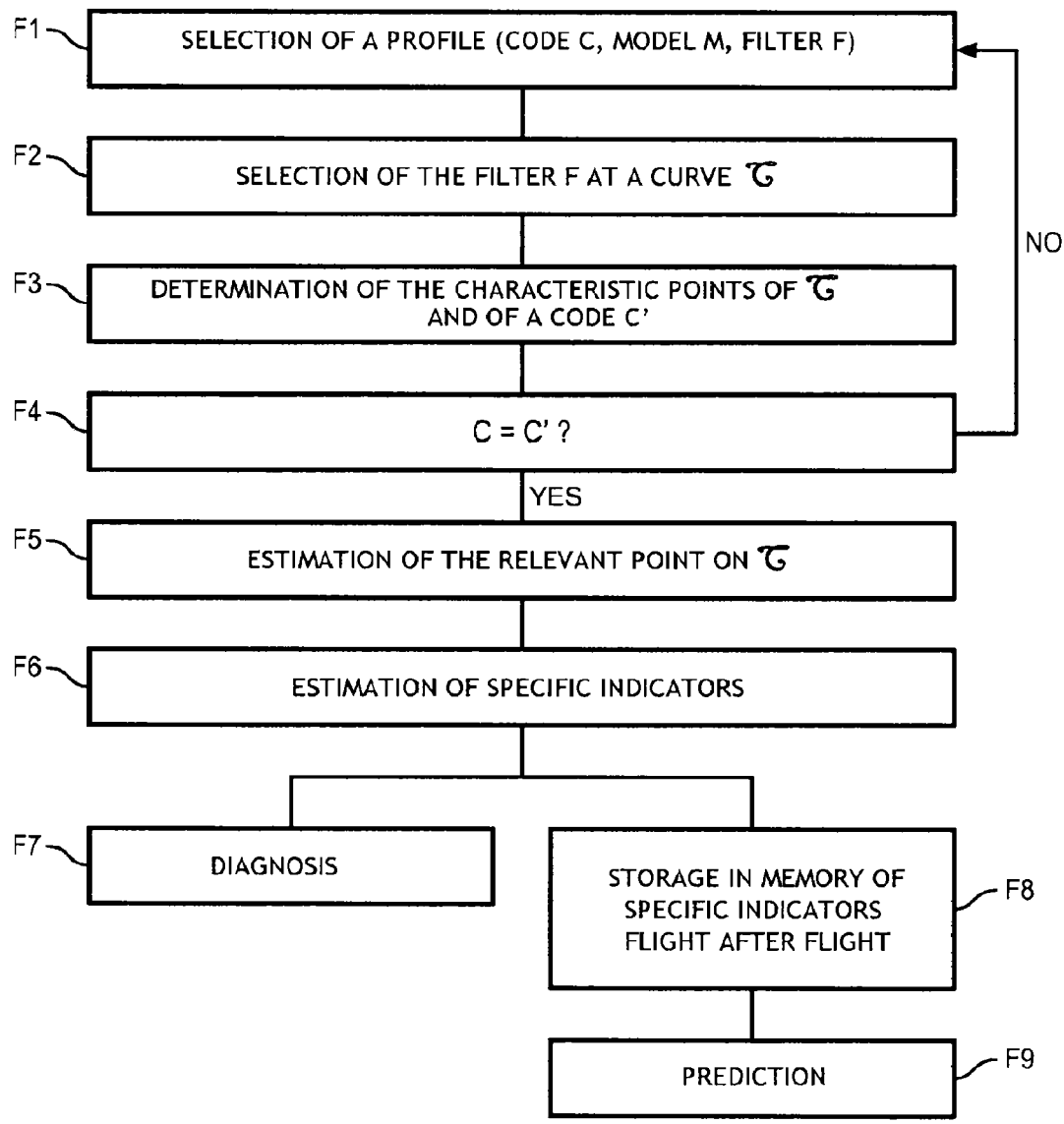

Other features and advantages will further become apparent from the following description, which is purely illustrative and non-limiting and may be read with reference to the appended figures, wherein:

FIG. 1 represents a diagram illustrating the construction of specific indicators, FIG. 2 represents a diagram illustrating an exemplary algorithm based on pattern recognition, FIG. 3 schematically represents the hardware means applied within the scope of the invention, FIG. 4 represents an exemplary graphic interface displayed to an expert within the scope of the invention, FIG. 5 represents a flow chart illustrating steps of the learning process according to an embodiment of the invention, FIG. 6 represents a diagram illustrating an exemplary model allowing determination of the abscissa of a relevant point according to an embodiment of the invention, FIG. 7 illustrates examples of characteristic points of a curve, FIG. 8 represents a flow chart illustrating steps of the method for estimating on a curve a relevant point for detecting an anomaly of an engine according to an embodiment of the invention.

DETAILED DESCRIPTION OF AN EMBODIMENT

With reference to FIG. 3, an application for the invention relates to a method for estimating on a curve a relevant point for detecting an anomaly of an engine 9, said curve representing a time-dependent change of physical parameters of the operation of the engine, measured by at least one sensor 10 on said engine 9.

Such a method is applied by a computer 11 including computing means 12, a memory 13 and a communication interface 14. This interface may allow the computer to communicate with sensors 10 capable of acquiring measurements of operating parameters of the engine at different instants. Such an interface may be a wired interface of the Ethernet, USB, FireWire, serial, parallel type or a wireless interface of the Wifi or Bluetooth type.

The estimation by the computer 11 of a relevant point on a curve is achieved from comparisons with models of curves called profiles. As the analyzed curves are not always similar, the method uses several profiles. As an example, the analysis of the temperature of the output gases may use two profiles, one for cold starts and one for hot starts.

Such profiles may be determined by a learning process and stored in first storage means 15. These first storage means may be in the form of an external device to the computer such as an external hard disc USB or a network hard disc ("NAS"). The first storage means then communicate with the computer via a communication interface such as the communication interface 14. Alternatively, the first storage means may be integrated to the computer 11. The storing in memory of the profiles in the first storage means may assume the form of a database stored in the first storage means.

Said learning process may involve an expert in the operation of aircraft engines so that the latter selects a relevant point on learning curves. For this, the expert has a graphic interface 16 such as the one illustrated in FIG. 4, calculated by the computer 11. Such a graphic interface has a curve 17 in a selection window 18. This interface is displayed on a display device 19 which may be any type of screen such as an LCD, plasma, OLED screen or else a video projection screen coupled with a video projector. Such a display device is connected to the computer 11 through an analogue or digital video connection such as a SCART, VGA, DVI, DisplayPort or HDMI connection. The expert uses input means 20 for selecting a relevant point on a learning curve 17 displayed in the selection window 18. Such input means may consist in a keyboard and a mouse, a trackpad, a trackball or any other pointing means allowing him/her to specify a point on the curve 17 such as a movement detection interface. The data stored in memory during the learning process may be stored on second storage means 21 similar to the first storage means 15 and also connected to the computer 11.

As illustrated in FIG. 5, said learning process includes the steps E1 to E11 described below.

During a first step E1, several learning curves $Ca$ may be shown to the expert. These curves are displayed in a selection window 18 of the graphic interface 16. These curves are all similar although not identical and all correspond to a same type of curve on which a relevant point has to be able to be determined automatically. These curves may for example be curves of temperature, pressure, of air or fuel flow rate measured at different points of an aircraft engine or else further curves of the speed of rotation of different rotating elements of such an engine such as the high and low pressure compressors. Pre-selection of such a batch of similar curves may have been performed automatically by a machine or else manually by an expert from a set of curves measured on one or several aircraft engines, for example by selecting a quantity type and by separating the curves measured on a full flight cycle and those only measured during the starting phase.

During a second step E2, an expert selects on each of these curves $Ca$ a relevant point P by means of the input means 20. A relevant point may correspond to a particular instant of the curve such as an instant for opening a valve, an instant of sharp variation of a temperature or of a pressure, an instant when certain conditions have been attained by the high pressure compressor or the low pressure compressor, a disengagement instant of the starter motor.

The determination of such instants may give the possibility of calculating useful specific indicators for estimating the operation condition of an engine such as the duration of the different starting phases of the engine, the ignition time, the stopping time or further the maximum and average gradients of the temperature of the exhaust gases.

During a third step E3, the learning curves Ca are stored in memory with their relevant point selected by the expert in the second storage means 21. The selected relevant point may be stored in memory as its abscissa on the learning curve.

During a fourth step E4, a filter F and a model M are selected. A filter consists in a filtering function adapted for modifying a curve so as to simplify the detection thereon of a characteristic point. Such filtering may consist in smoothing, simple or double differentiation or else further a processing operation for enhancing irregularities of the curve. The corresponding filtering functions may be a Gaussian distribution, a square wave, triangle distribution, a Haar or Daubechies waveform.

As illustrated in FIG. 6, a model consists in a function allowing determination of the abscissa of a relevant point 22 from abscissas of characteristic points 23 of a curve. Such characteristic points may correspond to local extrema, inflection points or points with a sudden change in slope. In an alternative, the model may be a generalized linear model with selection of variables. Such a model may fit the equation: $t = AX$ wherein t is the abscissa of the relevant point to be estimated;

A is a line vector containing regression coefficients,

X is a column vector for which the components are abscissas x of the characteristic points and transforms of these abscissas such as $\ln x$, $\tan x$, $1/x$ . . . .

The selection of a filter F and of a model M may be automatically made by the computer 11, optionally randomly from among a base of filters and of possible ranges of values of the regression coefficients, or else such a selection may involve the expert.

During a fifth step E5, the filter F selected in the fourth step E4 is applied to each of the learning curves $\tau a$. The application of the filter may consist in a convolution calculation between each curve and the filtering function of the filter so as to obtain filtered learning curves as illustrated in FIG. 7.

During a sixth step E6, the computer 11 determines the characteristic points of each of the filtered learning curves. As illustrated in FIG. 7 and as mentioned earlier, these characteristic points may correspond to local extrema, inflection points, i.e. having a maximum of the first derivative, or points with a sudden change in slope, i.e. having a maximum of the second derivative between a local extremum and the inflection point, and between the inflection point and the other local extremum. In the case of the determination of local extrema, it is possible to minimize the number of retained points by only retaining at the end of this determination consecutive local extrema for which the ordinate difference is greater than a first predetermined threshold. Advantageously, only the abscissa of these characteristic points is stored in memory.

During a seventh step E7, the computer determines from the set of characteristic points of the filtered learning curve $\tau a$, recurrent characteristic points. These recurrent points are characteristic points detected in the majority of the processed filtered learning curves. According to an alternative, these recurrent characteristic points are only determined from local extrema of the learning curves. In this alternative, the recurrent characteristic points other than the consecutive recurrent local extrema are determined a posteriori and in the following way: an inflection point is selected between two consecutive local extrema, and if there are several of them, the one having the maximum ordinate on the first derivative is selected. A point representing a sudden change in variation is selected between a local extremum and an inflection point, and an inflection point and a local extremum. If there are several sudden variation points, the one having the maximum ordinate on the second derivative is selected.

The computer 11 also determines a binary code C, each component of which codes the direction of variation between two consecutive recurrent characteristic points. For example a "1" may code the fact that a characteristic point with ordinate y1 is followed by a characteristic point of ordinate y2 greater than y1, and a "0" may then code the fact that a characteristic point of ordinate y1 is followed by a characteristic point of ordinate y2 less than y1. Such a code is then a binary representation of the profile of the ordinates of the recurrent characteristic points common to the majority of the learning curves $\tau a$. The filtered learning curves on which the determined recurrent characteristic points do not appear may be set aside and may be used for determining another profile during a subsequent learning process. A first profile is thus determined from a maximum number of learning curves and then a second profile is determined from a maximum number of curves from among the remaining curves . . . .

During an eighth step E8, the computer 11 determines the abscissa of a relevant point P' on one or several of the learning curves $\tau a$ from recurrent characteristic points, notably from their abscissas, determined in the seventh step E7 and from the model M selected in the fourth step E4.

During a ninth step E9, the computer 11 estimates an error in the determination of each of the relevant points determined in the eighth step E8 by comparing the abscissa of a relevant point P' determined in the eighth step E8 and the abscissa of the relevant point P selected by the expert on the same learning curve in the second step E2. The computer then determines the quadratic mean of the whole of the estimated determination errors. This mean determination error is associated with the filter F and with the model M selected in the fourth step E4.

During a tenth step E10, the computer determines whether the mean determination error of the relevant point estimated in the ninth step E9 is sufficiently small for considering the determination of the relevant points carried out in the eighth step E8 as satisfactory. According to an embodiment, the computer compares the mean determination error with a second predetermined threshold. As long as the mean determination error is greater than this second predetermined threshold, the computer rejects the filter F and the model M selected in step E4, selects a new filter and a new model, and then again applies steps E5 to E10 with this new filter and this new model. According to another embodiment, the computer applies steps E4 to E10 for a predetermined number of times and selects the filter F/model M pair giving the smallest mean determination error of the relevant point.

During an eleventh step E11, the computer 11 stores in memory in a profile the filter F and the model M selected in the tenth step E10 as well as the binary code C determined in the seventh step E7. The profile may also comprise the first predetermined threshold used in the sixth step E6 for determining local extrema. This profile is recorded in the first storage means 15.

When the learning curves are curves with several dimensions, the preceding steps are applied along each of the dimensions. According to a first alternative, a profile is stored in memory at the end of the eleventh step E11 for each of the dimensions. According to a second alternative, only a profile including the filter/model pair of the dimension having the smallest determination error is stored in memory at the end of the eleventh step E11. In both of these alternatives, each profile then integrates an indication of the dimension to which it relates. According to a third alternative, the selected model M is a model with selection of a variable fitting the equation t=AX, X being a vector for which the components are abscissas of characteristic points along each of the dimensions of the learning curves. Such a model is said to be multi-dimensional. Such characteristic points are then determined during the sixth step E6 for each of the dimensions of each learning curve. Also, the recurrent characteristic points and the binary code are then determined during the seventh step E7 for each of these dimensions. These binary codes are also recorded in a multi-dimensional profile during the eleventh step E11, associated with an indication of the dimension to which they relate.

As illustrated in FIG. 8, the method for estimating on a curve t a relevant point for the detection of an anomaly of the engine 9, by means of profiles determined according to the learning process described above, may be applied by the computer 11, according to steps F1 to F9.

This curve $\tau$ is obtained from measurements of operating parameters of the engine acquired at different instants by at least one sensor 10.

During a first step F1, the computer selects a profile from among the profiles generated by the learning process described above and stored in memory in the first storage means 15.

During a second step F2, the computer 11 applies to the curve "$\tau$" the filter F associated with the profile selected in the first step F1 and obtains a filtered curve.

During a third step F3, the computer 11 determines the characteristic points of the filtered curve obtained in the second step F2. The determination of the local extrema of the curve ͡C may use the first predetermined threshold associated with the profile selected in the first step F1. From these characteristic points, the computer then determines the binary code C', each component of which codes the direction of variation of two consecutive characteristic points. Said code is determined in the same way as the binary code determined in the seventh step E7 for the recurrent characteristic points of a learning curve.

During a fourth step F4, the computer determines whether the code C' obtained in the third step F3 is identical with the code C associated with the profile selected in the first step F1.

In that case, the shape of the curve ͡C corresponds to the selected curve profile and the computer then carries out the fifth step F5 during which the selected profile is used for determining a relevant point on the curve ͡C. In the opposite case, the curve ͡C does not correspond to the selected profile and the computer 11 again applies steps F1 to F4.

During the fifth step F5, the computer determines a relevant point, as an example its abscissa, on the curve ͡C from characteristic points determined in the third step F3 and from the model M associated with the profile selected in the first step F1.

The curve ͡C may also be multi-dimensional. According to a first alternative, if the profiles stored in memory during the learning phase all relate to a single and same dimension, the steps F1 to F5 above are applied to this dimension. According to a second alternative, if profiles each associated with a dimension have been stored in memory during the learning phase for at least two of the dimensions of the curve ͡C, the steps F1 to F5 are applied separately to each of these dimensions and an average relevant point is determined from relevant points determined according to each of the dimensions, the abscissa of the average relevant point may for example be an average of the abscissas of the relevant points determined according to each of the dimensions. According to a third alternative, if the profiles stored in memory are multi-dimensional, each including a multi-dimensional model, the steps F1 to F5 described above are then applied so that, during the third step F3, the characteristic points of the curve and a binary code are determined for each of the dimensions of the curve. The computer then determines during the fourth step F4 the multi-dimensional profile which is the most adapted to the curve from these binary codes and from binary codes recorded in the selected multi-dimensional profile.

During a sixth step F6, the computer 11 may use one or several relevant points determined by applying the steps F1 to F5 for at least estimating a specific representative indicator of the operating condition of the engine 9. As indicated earlier, such indicators may be the duration of the different starting phases of the engine, the ignition time, the stopping time or further the maximum and average gradients of the temperature of the exhaust gases.

Different processing operations may be applied from these indicators.

A first processing operation may consist in a diagnostic of the condition of the engine at the instant of acquisition of the curves used for determining said indicators. During a seventh step F7, the computer thus uses the indicators for estimating whether the engine has an operating anomaly which may justify a return to the workshop for maintenance, for example for replacing a faulty part.

A second processing operation may consist in a prediction of a future degradation of the operation of the engine from successive measurements. During an eighth step F8, the indicators determined from measurements relative to a flight of the engine are thus stored in memory and this step is repeated flight after flight in order to obtain a succession of indicators for which the time-dependent change is representative of the time-dependent change in the operating condition of the engine 9. During a ninth step F9, the computer then applies a process for predicting future degradation of the condition of the engine, from the time-dependent change in the indicators stored in memory flight after flight in step F8.

The invention claimed is:

1. A method for estimating on a curve a relevant point for detecting an anomaly of an engine, said curve representing a time-dependent change in physical operation parameters of the engine measured by at least one sensor on said engine, applied by a computer connected to first storage means,
said first storage means storing in memory at least one profile comprising a directional binary code, each component of which codes a direction of variation between two consecutive characteristic points of at least one learning curve, a model allowing estimation of a relevant point from a set of characteristic points of a curve, and a filter,
said method comprising:
a/ selecting a profile stored in memory in the first storage means;
b/ applying the filter of the selected profile to said curve;
c/ determining a set of characteristic points of said filtered curve and of the directional binary code, each component of which codes the direction of variation of two consecutive characteristic points belonging to said set of characteristic points;
d/ comparing the determined directional binary code and the code of the selected profile;
e/ depending on said comparison, estimating the relevant point on said curve from the characteristic points of said filtered curve and from the model of the selected profile.

2. The method according to claim 1, wherein if the determined directional binary code is different from the code of the selected profile, a new profile stored in memory in the first storage means is selected and the computer again executes steps b/ to e/.

3. The method according to claim 1, wherein the relevant point is selected from among an instant for opening a valve, an instant for sharp variation of a temperature or pressure, an instant for attaining certain conditions by a high pressure compressor or a low pressure compressor, a disengagement instant of a starter.

4. The method according to claim 1, wherein the characteristic points of curves are selected from among inflection points, local extrema, sudden changes in slopes.

5. The method according to claim 1, wherein a profile further comprises a threshold and wherein the characteristic points are consecutive local extrema, for which the difference in ordinates is greater than said threshold.

6. The method according to claim 1, wherein said models are generalized linear models with selection of variables.

7. The method according to claim 1, wherein said models verify the equation: $t = AX$ Wherein
t is the abscissa of the relevant point to be estimated,
A is a line vector containing regression coefficients, X is a column vector, whose the components are abscissas of the characteristic points and of their transforms.

8. The method according to claim 1, further comprising a step for estimating from estimated relevant points of specific indicators selected for their representativity of the operating condition of the engine.

9. The method according to claim 8, further comprising a step for diagnosing the engine from estimated specific indicators.

10. The method according to claim 8, comprising a step for storing in memory in storage means, flight after flight, estimated specific indicators and a step for predicting a degradation of the operation state of the engine from the time-dependent change of the specific indicators stored in memory.

11. The method according to claim 1, wherein each profile stored in memory in the first storage means is determined by a learning process.

12. The method according to claim 11, wherein the learning process for a profile comprises:
a/ displaying by a display device several learning curves;
b/ determining by said computer a relevant point for detecting an anomaly on each of the learning curves, said relevant point of each of the learning curves being selected by an expert by means of input means;
c/ storing in second storage means each of said learning curves associated with said determined relevant point;
d/ selecting with said computer a filter and a model;
e/ applying with said computer the selected filter to each of the learning curves;
f/ determining with said computer characteristic points of each of the filtered learning curves;
g/ determining with said computer from the determined characteristic points, recurrent characteristic points appearing on each filtered learning curve and a directional binary code, for which each component codes the direction of variation between two consecutive recurrent characteristic points;
h/ from determined recurrent characteristic points and from the selected model, estimating with said computer the relevant point;
i/ estimating with said computer the error associated with the selected filter and model in step d/ by comparing the relevant point estimated with the relevant point selected by the expert in step b/;
j/ storing in memory, in said first storage means, a profile comprising said determined directional binary code, said filter and said model allowing minimization of the estimated error or obtaining an estimated error below a determined threshold.

13. A computer program product comprising program code instructions for executing steps of the method according to claim 1 when said program is executed on a computer.

14. A data processing system comprising a computer, input means, at least one display device configured for applying the steps of the method according to claim 1.

* * * * *